US008059972B2

(12) United States Patent
Yamada et al.

(10) Patent No.: US 8,059,972 B2
(45) Date of Patent: Nov. 15, 2011

(54) OPTICAL RECEIVER AND VISIBLE LIGHT COMMUNICATION SYSTEM

(75) Inventors: Masashi Yamada, Gunma (JP); Kousuke Nakamura, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 861 days.

(21) Appl. No.: 12/039,660

(22) Filed: Feb. 28, 2008

(65) Prior Publication Data

US 2008/0212981 A1  Sep. 4, 2008

(30) Foreign Application Priority Data

Mar. 1, 2007 (JP) ................................. 2007-51583
Jun. 1, 2007 (JP) ............................... 2007-147352
Jan. 30, 2008 (JP) ............................... 2008-018601

(51) Int. Cl.
*H04B 10/06* (2006.01)
(52) U.S. Cl. ........ 398/208; 398/202; 398/210; 398/212; 398/118; 398/119; 398/127; 398/130; 398/172
(58) Field of Classification Search .......... 398/118–120, 398/127–131, 171, 202, 208–214, 172
See application file for complete search history.

(56) References Cited

U.S. PATENT DOCUMENTS

| 4,945,541 | A | 7/1990 | Nakayama |
|---|---|---|---|
| 5,077,619 | A | 12/1991 | Toms |
| 6,588,950 | B1 | 7/2003 | Pfeiffer |
| 7,546,038 | B2 * | 6/2009 | Wang et al. .................... 398/118 |
| 7,650,082 | B2 | 1/2010 | Yamada et al. |
| 7,689,130 | B2 * | 3/2010 | Ashdown ...................... 398/172 |
| 2001/0050795 | A1 | 12/2001 | Numata et al. |
| 2004/0109696 | A1 | 6/2004 | Toshihisa |
| 2005/0286907 | A1 * | 12/2005 | Masuda et al. ................ 398/186 |
| 2006/0056855 | A1 * | 3/2006 | Nakagawa et al. ........... 398/183 |
| 2006/0209945 | A1 * | 9/2006 | Yamaguchi .................... 375/232 |
| 2007/0031157 | A1 | 2/2007 | Yamada et al. |

FOREIGN PATENT DOCUMENTS

| JP | 09-083457 A | 3/1997 |
|---|---|---|
| JP | 10-051387 | 2/1998 |
| JP | 2002-290335 | 10/2002 |
| JP | 2003-318836 | * 11/2003 |

(Continued)

OTHER PUBLICATIONS

Taguchi: "Future Prospect and Application of White LED Lighting System Technologies", CMC Publishing, Jun. 2003, pp. 1-19.*

(Continued)

*Primary Examiner* — Li Liu
(74) *Attorney, Agent, or Firm* — Law Office of Katsuhiro Arai

(57) ABSTRACT

A data signal to be transmitted is supplied to a modulator of a transmitter, and the modulator modulates the output of a blue light-excited white LED and outputs blue LED light and phosphor light. The modulated blue light enters to a photo-electric converter through an LED light transmission color filter. The modulated phosphor light on the other hand enters to another photo-electric converter through a phosphor light transmission color filter. The photo-electric converters convert incident light to electric signals. The converted signals are amplified by amplifiers. Then, equalizers emphasize the harmonic component therein according to the response characteristic of the blue light and the response characteristic of the phosphor light for reduction of the dullness of waveforms.

20 Claims, 7 Drawing Sheets

FOREIGN PATENT DOCUMENTS

| | | |
|---|---|---|
| JP | 2003-318836 A | 11/2003 |
| JP | 3465017 | 11/2003 |
| JP | 2007-043592 A | 2/2007 |

OTHER PUBLICATIONS

T. Taguchi et al., "Future Prospect and Application of White LED Lighting System Technologies", CMC Publishing Co., Ltd., Jul. 2003.

Shiroiro LED Shomei Shisutemu Gijutsu no Ouyou to Shorai tenbou (Applications and Future Prospects of White LED Illumination System Technology), CMC Publishing, Jun. 2003.

IEICE Technocal Report ICD 2005-44 vol. 105 No. 184 Prototyping LED Driver for Visible Light Communication and Evaluating Response Performance of Visible Light LED.

2006 IEICE Engineering Sciences Society Conference Review on Brightness Deterioration of White LED.

2005 IEICE Communications Society Conference an Optical Analysis of Reception Characteristic for Parallel Optical Wireless Communication System.

Aruga, Spatial Transmission Optics System, Spatial Transmission Optics, Sep. 1, 2000, p. 158-167, Chapter 6, K.K. Suiyosha, Tokyo, Japan.

Triceps Planning Devision, Signal Level and Noise, TRICEPS Library—Infrared Communication Technology, Jun. 1, 1997, p. 49-65, Triceps K.K., Tokyo, Japan.

Yonezu, PIN Photodiode, Optical Communication Device Engineering -light emitting & receiving device-, Feb. 15, 1984, p. 359-384, Kougaku Tosho K.K., Tokyo, Japan.

\* cited by examiner

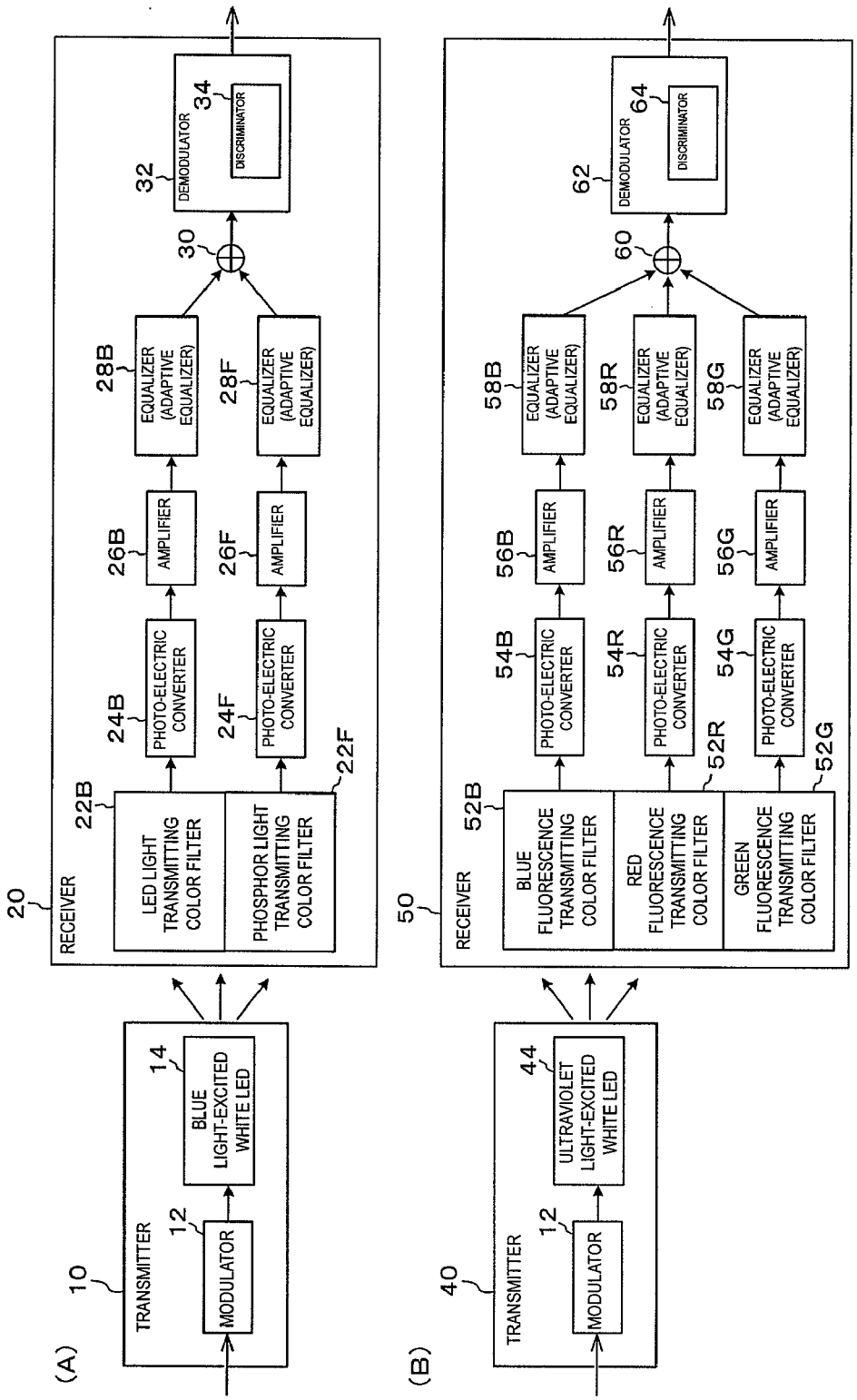
[FIG. 1]

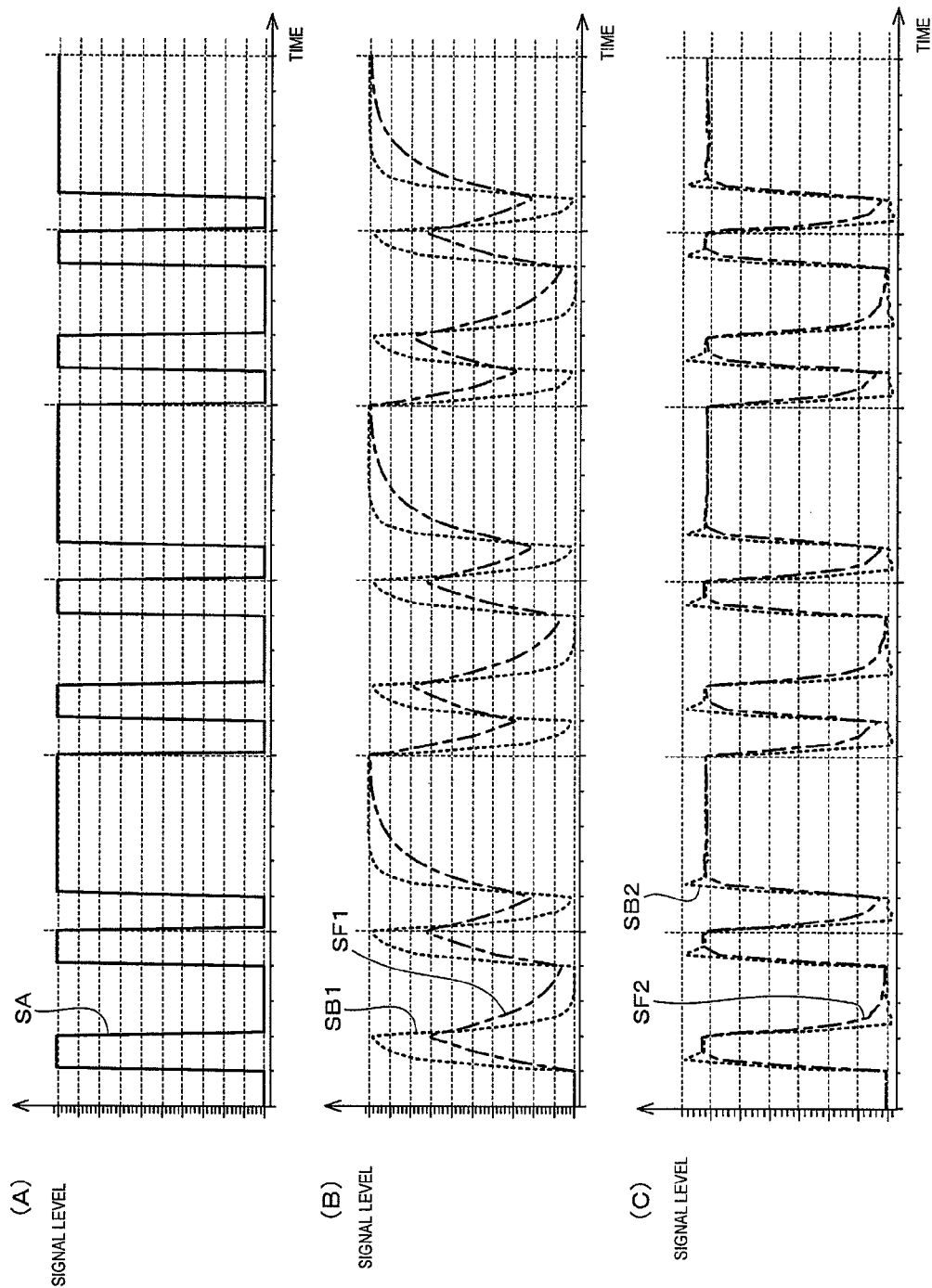
[FIG. 2]

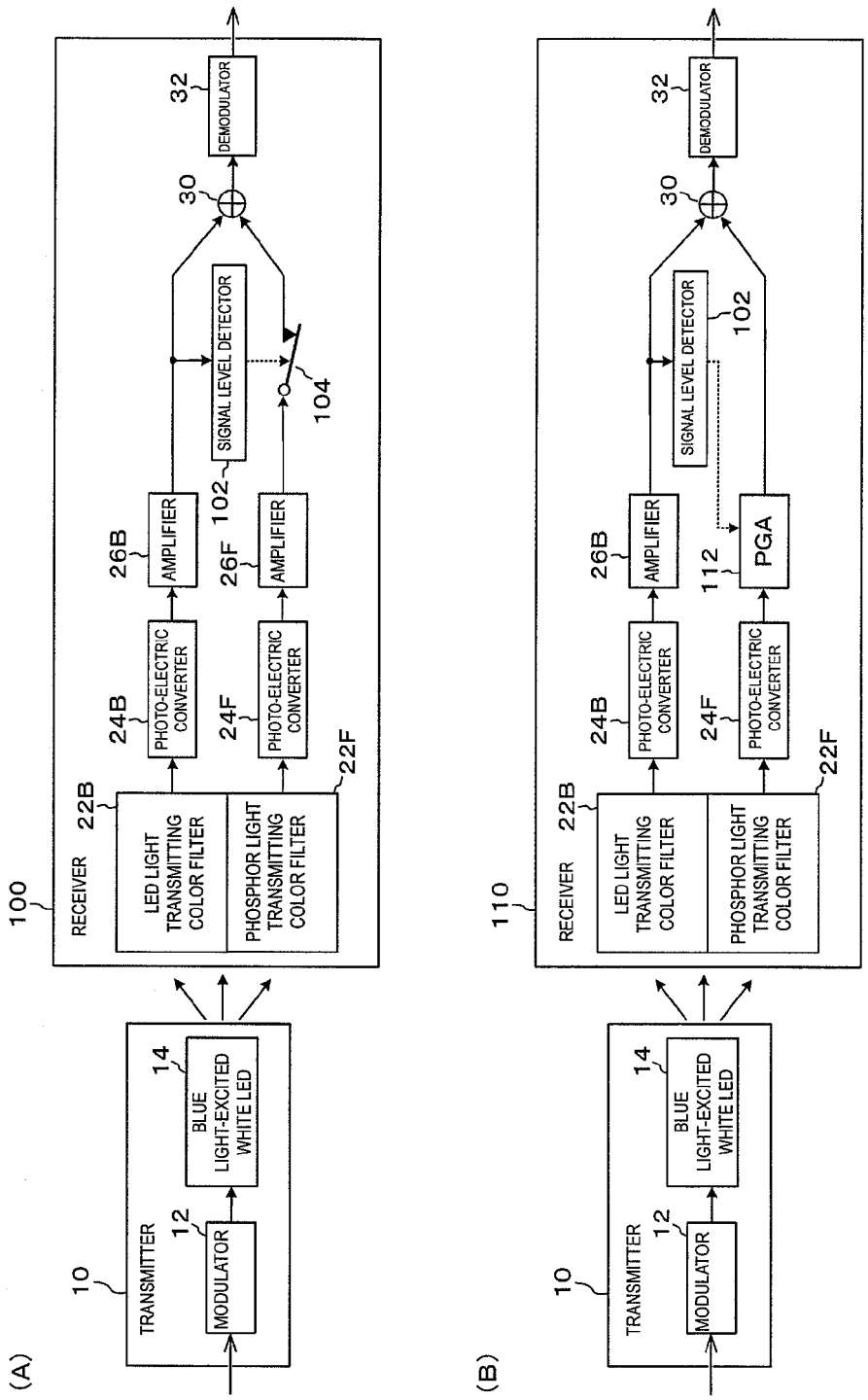
[FIG. 3]

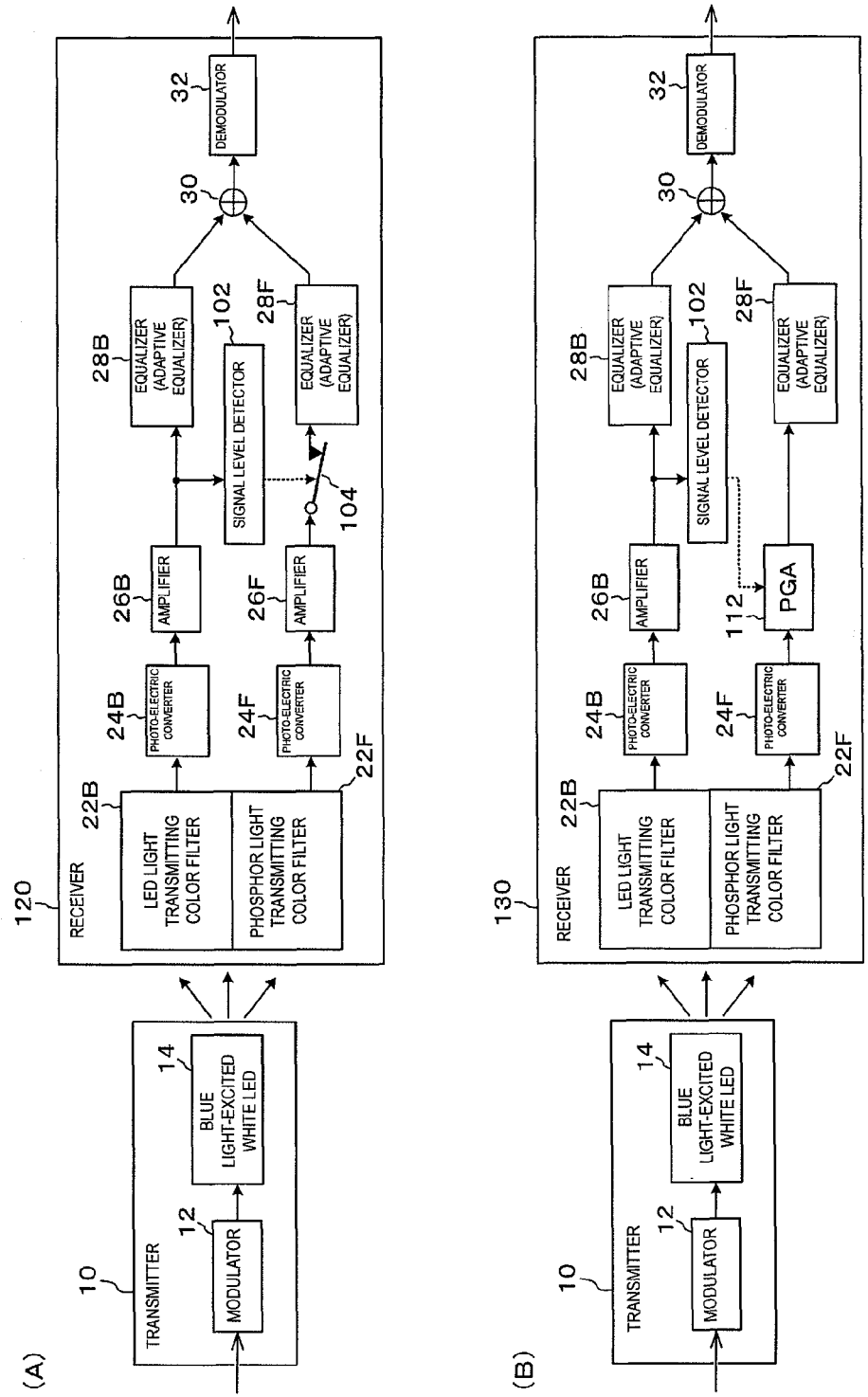
[FIG. 4]

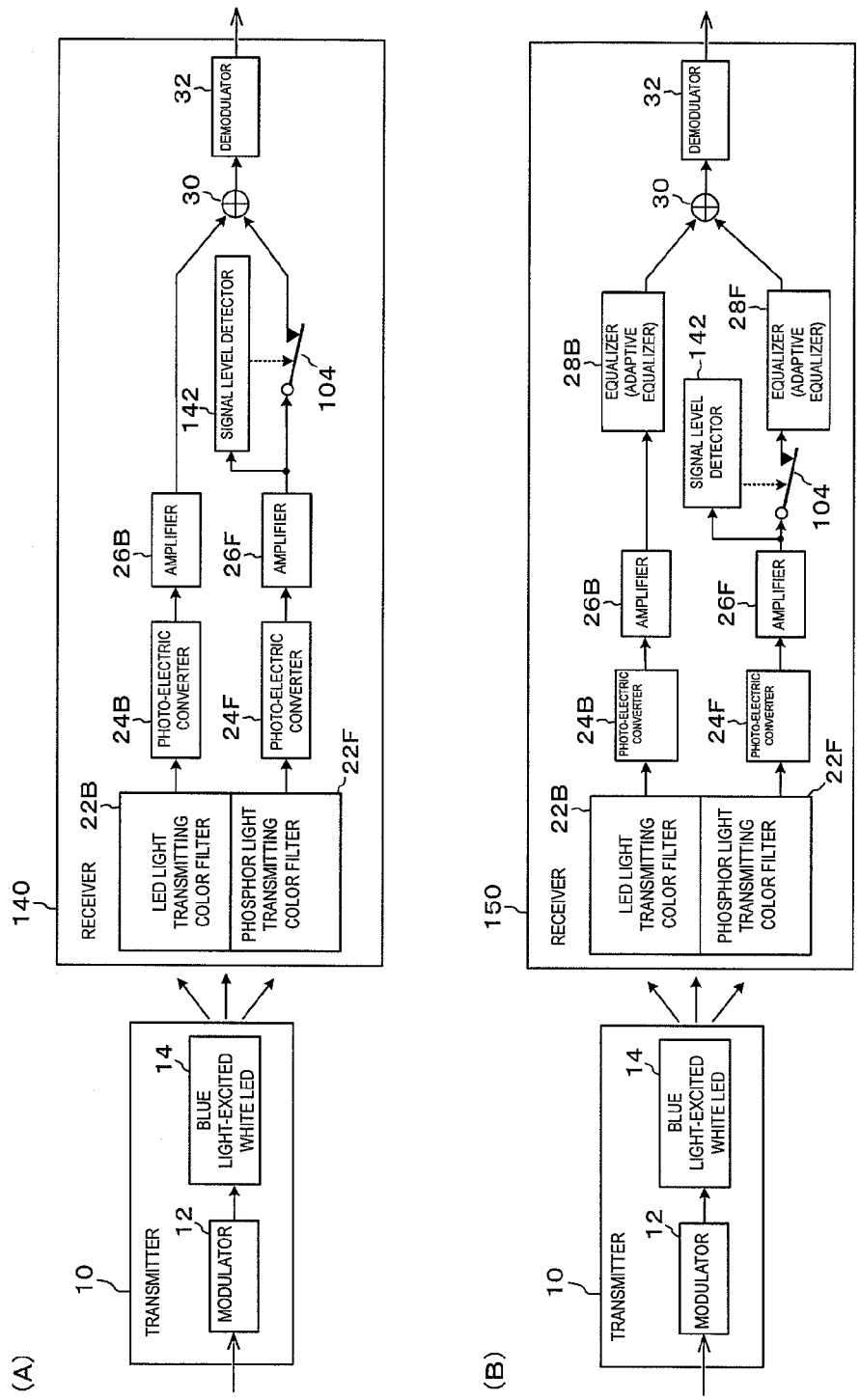
[FIG. 5]

[FIG. 6]
PRIOR ART
(A)
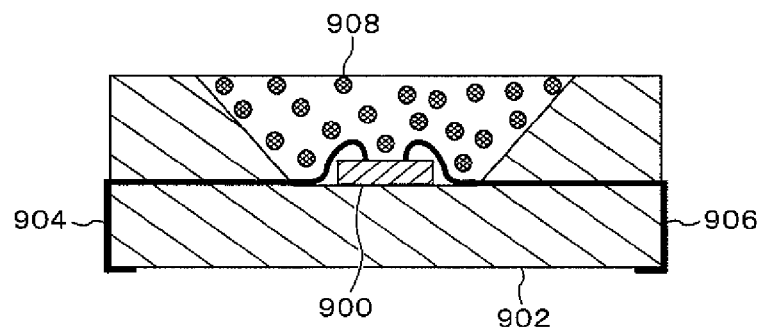
(B)
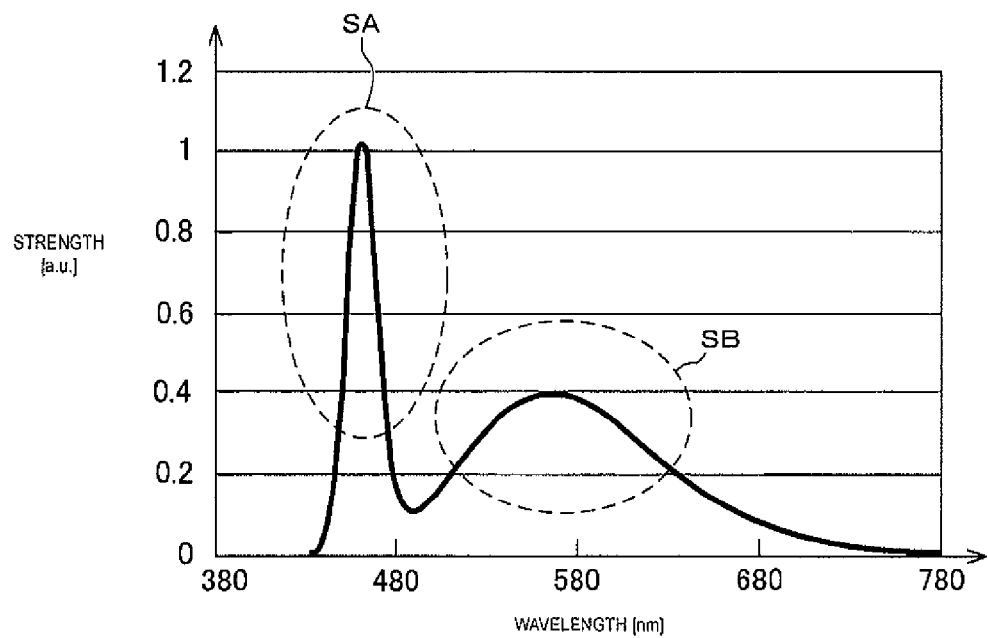

[FIG. 7]
PRIOR ART
(A)
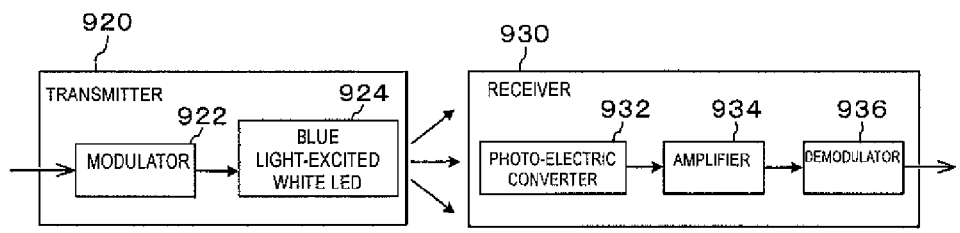
(B)
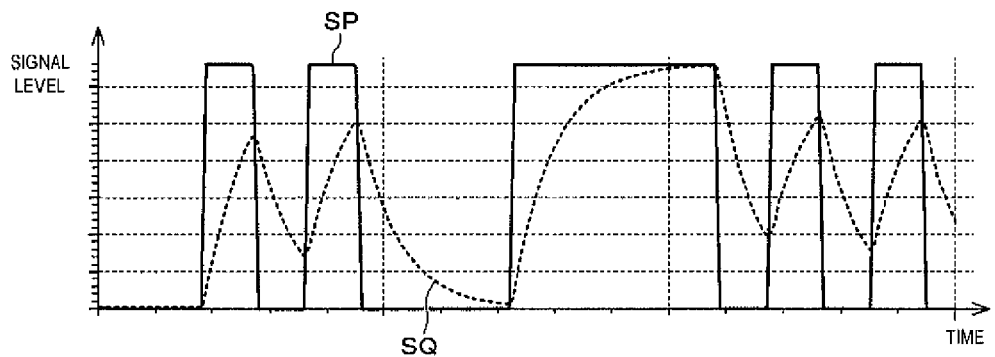
(C)
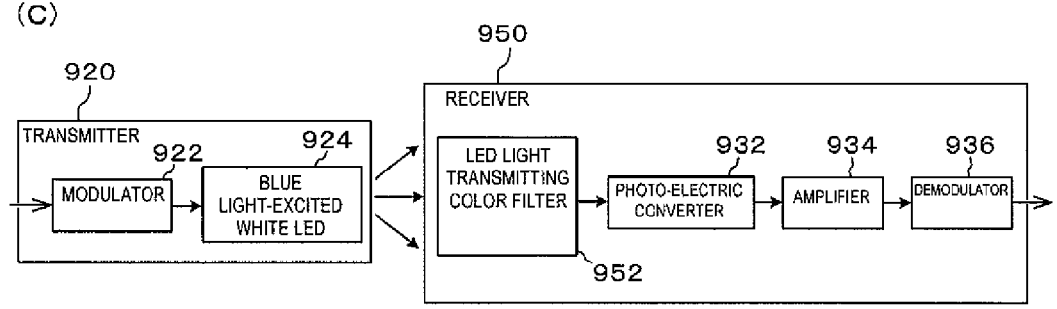

US 8,059,972 B2

OPTICAL RECEIVER AND VISIBLE LIGHT COMMUNICATION SYSTEM

BACKGROUND OF THE INVENTION

1. Field of the Invention

The present invention relates to a data transmission system that transmits signals by using visible light and, in particular, to an optical receiver and a visible light communication device suitable for communication using a white light emitting diode (which will be called white LED, hereinafter) including light emission by a phosphor.

2. Description of the Related Technology

In recent years, white LEDs have been developed increasingly as diverse as illuminations, lamps for cars and liquid crystal backlights. A white LED is characterized in that the speed of ON/OFF switching response is significantly higher than that of white light sources such as a fluorescent lamp. Accordingly, a visible light communication system has been proposed that provides a data transmission function to illumination light by a white LED by using white light by an LED as a data transmission medium (refer to Japanese Patent No. 3465017). In other words, the strength of emitted light by a white LED is modulated according to the transmit data, and the receiver side converts the strength of the light to an electric signal by using a photo-electric converter such as a photodiode (which will be called PD, hereinafter) to implement the data transmission.

White LEDs can be roughly categorized into three types based on the emission types as in "Shiroiro LED Shomei Shisutemu Gijutsu no Ouyou to Shorai tenbou (Applications and Future Prospects of White LED Illumination System Technology), CMC Publishing.

[1] Blue light-excited white LED: A combination of a blue LED and a phosphor that mainly emits yellow light. A YAG (yttrium aluminum garnet) based phosphor is typically placed around a blue LED in one package. In this type, the surrounding phosphor is excited by blue light output from the blue LED placed at the center, and the phosphor outputs light in a color (mainly yellow ray) in complementary color relation with blue. Mixing the yellow fluorescence by the phosphor and blue light by the blue LED provides pseudo white light.

The advantages of the blue light excited white LED may include (1) higher efficiency of energy use and higher illumination compared with the other type and (2) the inexpensive manufacturing since the construction is simple. The disadvantages, on the other hand, may include a low color rendering property. The term, "color rendering property" refers to a property how the color of an object appears under an illumination, and it is said that the closer color an object appears to the color under natural light the better the color rendering property is.

FIG. 6A shows an example of the blue light-excited white LED. As shown in FIG. 6A, a blue LED 900 is provided on the main surface of a resin case 902. A driving voltage receiving terminal (not shown) of the blue LED 900 connects to extractor electrodes 904 and 906. When driving voltage is applied to the extractor electrodes 904 and 906, blue light is output from the blue LED 900 and is partially input to a phosphor 908. Thus, the phosphor 908 is excited, and fluorescence is output. Among blue LEDs having emission characteristics with various wavelengths, one with the peak wavelength within a range of 440 to 470 nm is used here. The phosphor 908 to be used is one that emits light with a longer wavelength than the peak wavelength of the blue LED. Then, in order not to block the light emitted by the blue LED, phosphor particles 908 are placed in a radiant and thick translucent resin. FIG. 6B shows a spectrum characteristic of a blue light-excited white LED. The part surrounded by a broken line SA is a blue light part, and the part surrounded by the broken line SB is an emitted light part by a phosphor. Such light emission by a phosphor may exist on the longer wavelength side than the peak wavelength of the emitted light by a blue LED.

[2] An ultraviolet light-excited white LED is a combination of an ultraviolet LED and phosphors that emit rays in three primary colors of R, G and B (red, green and blue). The phosphors that emit rays in three primary colors of R, G and B are placed around the ultraviolet LED in one package. In this type, the surrounding phosphors are excited by ultraviolet light output from the ultraviolet LED at the center, and the rays in three primary colors of R, G and B are output from the phosphors. White light is obtained by mixing the R, C and B rays.

Among ultraviolet LEDs having emission characteristics with various wavelengths, the one with the peak wavelength in a range of about 380 to 410 nm is used here. The phosphors to be used are ones that emit light with longer wavelengths than the peak wavelength of the ultraviolet LED. Then, in order to sufficiently absorb the light emitted by the ultraviolet LED for excitation, many phosphor particles, which emit three primary color rays, are placed within a radiant and thick translucent resin.

The advantage of the ultraviolet light-excited white LED may be a good color rendering property as described above. The disadvantages on the other hand may be that (1) it is difficult to obtain a high illumination since the efficiency of energy use is lower than that of the blue light-excited white LED and (2) the driving voltage for the LED is high due to the ultraviolet light emission.

[3] A tri-color white LED is a combination of R, G and B LEDs. The structure has three types of LED of a red LED, a green LED and a blue LED in one package. In this type, white light is obtained by causing the simultaneous emission by the three primary color LEDs.

The advantage of the tri-color white LED may be a good color rendering property like the ultraviolet light-excited white LED. The disadvantage on the other hand may be that it is more expensive than other types since three types of LED are implemented in one package.

Next, characteristics of a case where the white LEDs in those types are used for data transmission are as follows:

[1] In a case where the blue light-excited white LED is used, a transmission rate of about several Mbps can be only obtained since the speed of response of light output from the phosphor is low (refer to "Kashikou Tsushin Yo LED Doraiba No Shisaku To Kashikou LED No Outou Seinou No Hyouka (Prototyping LED Driver for Visible Light Communication and Evaluating Response Performance of Visible Light LED)", IEICE Technocal Report ICD 2005-44, Vol. 105, No. 184). FIG. 7A shows a configuration of the transceiver in the type. In FIG. 7A, the data to be transmitted is input to and undergoes predetermined modulation in a modulator 922 of a transmitter 920, and the modulation signal is supplied to a blue light-excited white LED 924. Thus, the output light of the blue light-excited white LED 924 is modulated by a modulation method such as OOK (On-Off Keying) and blinks. The blinking light after the modulation is input to and converted to an electric signal in a photo-electric converter 932 in a receiver 930, is amplified in an amplifier 934 and then is input to a demodulator 936 where the data demodulation is performed. Here, when the on/off switching of light emission is performed rapidly on the transmitter side, dull waveforms occur due to the low speed of response of light emitted from the phosphor 908, which may cause an intercode interference.

In other words, as shown in FIG. 7B, the output signal SQ of the photo-electric converter 932 is dulled against the modulation signal SP by the modulator 922. This may inhibit the implementation of high speed transmission by using a blue light-excited white LED.

In order to solve the problem, a method for increasing the speed has been disclosed (refer to Japanese Patent No. 3465017 below) in which an optical component with a lower speed of response, which is output from a phosphor, is rejected by an LED light transmission color filter that transmits blue only, which is provided before the photo-electric converter. FIG. 7C shows the transceiver configuration in this case in which an LED light transmission color filter 952 is placed on the light incident side of the photo-electric converter 932 of the receiver 950. The LED light transmission color filter 952 rejects the light emitted from the phosphor with a lower speed of response in an optical signal. Thus, light by the blue LED 900 is the only input to the photo-electric converter 932, and faster data transmission than that of the configuration above can be performed as a result. However, a transmission rate of about several tens Mbps can only be obtained even by using this method. In addition, as disclosed in "Shiroiro LED No Kido Rekka No Kousatsu (Review on Brightness Deterioration of White LED)", 2006, The Institute of Electronics, Information, Communication Engineers (IE-ICE), Engineering Sciences Society Conference, it has been pointed out that the data transmission quality may not be maintained due to the dispersion and secular deterioration of the emission characteristic and the uneven spatial distribution of color temperatures of the white LED.

[2] In a case where the ultraviolet light-excited white LED is used, the transmission rate may be about several Mbps for the same reason in the case using the blue light-excited white LED. In addition, it is difficult to configure a driver since the driving voltage for the LED is high.

In a case where the tri-color white LED is used, data transmission is allowed by wavelength multiplexing in which the LEDs transfer different signals, which increases the speed, with a less optical component emitted by the phosphor than that of the method above (refer to JP-A-2002-290335). However, the use of multiple LEDs may increase the costs.

Next, the quantity of light received by a PD is inversely proportional to the square of the distance if free space optical transmission is performed by a combination of a diffused light source such as an LED and a photo-electric converter such as a PD (refer to "Kukan Densou Kougaku (Spatial Transmission Optics)" Suiyosha, Chapter 6 or "An Optical Analysis of Reception Characteristic for Parallel Optical Wireless Communication System", 2005, The Institute of Electronics, Information, Communication Engineers (IE-ICE), Communications Society Conference). For that reason, a larger dynamic range is required on the receiver side in order to obtain a range of length for allowing the transmission of information to some extent. For example, in IrDA (Infra-red Data Association), which is the standard for infrared communication, a dynamic range of 100 dB or larger is required on the receiver side for a range of transmission length of 1 cm to 100 cm (refer to JP-A-10-51387 or "Sekigaisen Tsushin Gijutsu (Infrared Communication Technology)", TRICEPS, Chapter 2).

The turbulence light such as sunlight and light from a fluorescent lamp is significantly dominant in a case where free space optical transmission is performed by using light in a wavelength range of visible light as a data transmission medium. It is also difficult to optically reject the turbulence light through an optical filter to reject visible light, unlike infrared communication. For that reason, severer requirements are imposed on the receiver side. Generally, in order to obtain a larger dynamic range on the receiver side, an AGC (Automatic Cain Control) circuit may be used for the amplifier ("Sekigaisen Tsushin Gijutsu (Infrared Communication Technology)", TRICEPS, Chapter 7) or multiple amplifiers for different gains may be provided, and the gain switching for amplifiers may be performed according to the input signal level, for example.

As described above, it is difficult to say that the type using a tri-color white LED is suitable from the viewpoints of costs and general versatility since the LED itself is expensive though the use of the tri-color white LED can increase the transmission rate.

On the other hand, in a case where a blue light-excited white LED is used, high speed data transmission can be performed by using the LED light transmission color filter 952 that blocks the light emitted from the phosphor 908 with a low speed of response as described above, without the problem of costs. However, the cutoff frequency of a general blue LED is only about several tens MHz (refer to "Kashikou Tsushin Yo LED Doraiba No Shisaku To Kashikou LED No Outou Seinou No Hyouka (Prototyping LED Driver for Visible Light Communication and Evaluating Response Performance of Visible Light LED)", IEICE Technocal Report ICD 2005-44, Vol. 105, No. 184), and OOK modulation at a transmission rate over the frequency may also dull the output optical signal as shown in FIG. 7B, which may cause an intercede interference. Therefore, the upper limit of the data transmission rate is limited, and a transmission rate of about several tens Mbps can be only obtained. The data transmission quality also deteriorates.

Furthermore, like the case using the blue light-excited white LED, the problem of the transmission rate decreased by a low speed of response of light emitted by the phosphor may not be avoided in the data transmission using an ultraviolet light-excited white LED, and the driving voltage for the ultraviolet LED disadvantageously increases.

In addition, though the speed of response of light output from a phosphor may be increased by improving a phosphor material, there may be problems that a desired illumination cannot be obtained and/or that the cost of the phosphor material itself may increase. For those reasons, it is more advantageous to perform high speed data transmission by using a generic and inexpensive blue light-excited white LED.

On the other hand, there is no denying that the circuit structure is complicated in the method by which a larger dynamic range is obtained by using an AGC circuit or switching the gains of amplifiers according to the input signal level. In a case where the quantity of light entering to a PD is large since the distance between a transmitter and a receiver is short, the Space Charge Effect (refer to "Hikari Tsushin Soshi Kogaku (Optical Communication Device Engineering)", Kougaku Tosho) causes a wave tail at the trailing edge of a signal waveform, which may cause an intercode interference. As a result, good transmission quality may not be obtained.

SUMMARY OF CERTAIN INVENTIVE ASPECTS

Certain embodiments perform high speed data transmission by using light in multiple wavelength ranges, which is output from multiple light emitting means in different speeds of response upon optical output. It is another object to maintain the quality of data transmission. It is another object to obtain a good dynamic range.

According to an aspect of the invention, there is provided, in order to achieve the objects, an optical receiver that receives light beams in multiple wavelength ranges resulting from the reception of the output from means for obtaining multiple emitted light beams in different speeds of response by a light emitting diode and a phosphor that is excited to emit light by a light source of the light emitting diode and the modulation for performing data transmission, the optical receiver including multiple filter means for selectively allowing the light beams in the multiple wavelength ranges to pass through from the modulated light beams in the multiple wavelength ranges.

The optical receiver may further include multiple photo-electric converting means for converting light beams in multiple wavelength ranges through the multiple filter means to electric signals in wavelength ranges, multiple equalizing means for equalizing the electric signals after the conversion by the multiple photo-electric converting means according to the speed of response in wavelength ranges, adding means for adding the outputs of the multiple equalizing means to one added output, and discriminating means for performing discrimination processing on the added output by the adding means.

The multiple light emitting means may be blue light-excited white light emitting means for emitting white light by mixing the light of a light emitting diode with the peak wavelength in a range of about 440 to 470 nm and the light emitted from a phosphor that is excited by a light source of the light emitting diode to emit light in a longer wavelength than the peak wavelength of the light emitting diode.

The multiple light emitting means may be ultraviolet light-excited white light emitting means for emitting white light from multiple types of phosphor that are excited by a light source of a light emitting diode with the peak wavelength in a range of about 380 to 410 nm to emit light in a longer wavelength than the peak wavelength of the light emitting diode.

According to another aspect of the invention, there is provided an optical receiver that receives light beams in multiple wavelength ranges resulting from the reception of the output from means for obtaining multiple emitted light beams in different speeds of response by a light emitting diode and a phosphor that is excited to emit light by a light source of the light emitting diode and the modulation for performing data transmission, the optical receiver including multiple filter means for selectively allowing the modulated light beams in the multiple wavelength ranges to pass through, multiple photo-electric converting means for converting light beams through the multiple filter means to electric signals in the multiple filter means, adding means for adding the outputs of the multiple equalizing means to one added output, discriminating means for performing discrimination processing on the added output by the adding means, and signal control means for detecting the signal level of the output of one photo-electric converting means and preventing the output of the other photo-electric converting means from inputting to the adding means if the detected signal level is equal to or lower than a predetermined threshold value.

The signal control means may have signal level detecting means for detecting the signal level of the output of one of the photo-electric converting means, and switch means for controlling the output of the other photo-electric converting means according to the detection result by the signal level detecting means.

In this case, multiple equalizing means for equalizing the outputs of the multiple photo-electric converting means according to the speed of response upon light output by the light emitting means may be provided.

The equalizing means may be adaptive equalizers that adaptively equalize waveforms.

The visible light communication system uses the white light emitting means including as an emitting means the phosphor as the light source of a transmission side, and the light output from the white light emitting means is received with the optical receiver.

According to one inventive aspect, high speed data transmission is allowed in good transmission quality by using an inexpensive and high-speed generic white LED. The dynamic range of a receiver, that is, the range of data transmission length can be enlarged. Furthermore, the addition of the equalizing means can improve the transmission quality.

The objects, features and advantages disclosed in this specification will be apparent from the following detail descriptions and attached drawings.

BRIEF DESCRIPTION OF THE DRAWINGS

FIGS. 1A and 1B are circuit block diagrams showing main configurations of embodiments of the invention, and FIG. 1A is a block diagram of first and second embodiments, and FIG. 1B is a block diagram of a third embodiment;

FIGS. 2A to 2C are graphs showing signal waveforms in the main part in the first embodiment and show data signal waveforms, signal waveforms before equalization and signal waveforms after equalization, respectively;

FIGS. 3A and 3B are block diagrams of fourth and fifth embodiments, respectively;

FIGS. 4A and 4B are block diagrams of sixth and seventh embodiments, respectively;

FIGS. 5A and 5B are block diagrams of eighth and ninth embodiments, respectively;

FIG. 6A is a diagram showing an example of the configuration of a blue light-excited white LED, and FIG. 6B is a graph showing a spectrum characteristic thereof; and FIG. 7A is a circuit block diagram showing an example of a conventional technology, FIG. 7B is a graph showing a signal waveform example, and FIG. 7C is a circuit block diagram showing another example of the conventional technology.

DETAILED DESCRIPTION OF CERTAIN INVENTIVE EMBODIMENTS

Certain embodiments of the invention will be described in detail below based on embodiments.

First Embodiment

With reference to FIG. 1A and FIGS. 2A to 2C, a first embodiment of the invention will be first described. FIG. 1A shows a circuit structure of the main part of this embodiment. In FIG. 1A, describing from the transmitter side, data to be transmitted is input to a modulator 12 of a transmitter 10. The output side of the modulator 12 connects to a blue light-excited white LED 14 as described above, which functions as white light emitting means. The modulator 12 may be an LED driver that can quickly modulate output light of the blue light-excited white LED 14.

The device described with reference to FIG. 6A is used as the blue light-excited white LED 14. A blue LED 900 is used as a light source for the blue light-excited white LED 14. The blue LED 900 has the peak wavelength in a range of about 440 to 470 nm among blue LEDs having an emission characteristic in various wavelengths. A phosphor 908 emits light in longer wavelengths than the peak wavelength of the blue LED 900. The particulate phosphors 908 are scattered in a radiant and thick transparent resin in order not to block the light emitted by the blue LED.

On the other hand, the receiver side includes a circuit for LED light output from the blue LED of the blue light-excited white LED 14 and a circuit for fluorescence output from the phosphor. Describing the circuit for the LED light first of all, a photo-electric converter 24B, which is photo-electric converting means, is provided on the light incidence side through an LED light transmission color filter 22B, which is filter means. The output side of the photo-electric converter 24B connects to an equalizer or adaptive equalizer 28B through an amplifier 26B. In the circuit for phosphor light, a photo-electric converter 24F is provided on the light incidence side through a phosphor light transmission color filter 22F. The output side of the photo-electric converter 24F connects to an equalizer 28F through an amplifier 26F.

Among those components, the LED light transmission color filter 22B is a color filter that selectively allows blue light emitted by the blue LED 900 (refer to FIG. 6A) within the blue light-excited white LED 14 to pass through. The phosphor light transmission color filter 22F on the other hand is a color filter that selectively allows the light emitted by the phosphor 908 within the blue light-excited white LED 14 to pass through. The photo-electric converters 24B and 24F are photodetectors that convert input light to electric signals, and the converted electric signals are amplified by the amplifiers 26B and 26F. The equalizers 28B and 28F emphasize and equalize the high frequencies of the amplified signals.

The output sides of the equalizers 28B and 28F connect to the input side of an adder 30, which is adding means, and the output side of the adder 30 connects to a discriminator 34, which is a discriminating means, in a demodulator 32. The equalized signals are added by the adder 30, and the result is discriminated by the discriminator 34 to a binary signal.

Next, operations of this embodiment in the configuration above will be described. The data signal to be transmitted is supplied to the modulator 12 of the transmitter 10, and the modulator 12 modulates the optical output of the blue light-excited white LED 14 by OOK, for example. The blue light-excited white LED 14 has the configuration shown in FIG. 6A as described above, and the output light of the phosphor 908 is also modulated when the output light of the blue LED 900 is modulated.

The modulated blue LED light and phosphor light enter to a receiver 20. On the receiver 20 side, the blue light (refer to the broke line SA in FIG. 6B output from the blue LED 900 of the incident light) enters to the photo-electric converter 24B through the LED light transmission color filter 22B. On the other hand, the phosphor light (refer to the broken line SB in FIG. 6B) output from the phosphor 908 enters to the photo-electric converter 24F through the phosphor light transmission color filter 22F. In the photo-electric converters 24B and 24F, the incident light is converted to electric signals. The converted signals are amplified in the amplifiers 26B and 26F.

FIGS. 2A to 2C show signal waveforms of those components. FIG. 2A shows a data signal waveform on the transmitter side. Comparing with that, the converted signal waveform of blue light by the photo-electric converter 24B is as illustrated by the broken line graph SB1 in FIG. 2B. On the other hand, the converted signal waveform of phosphor light by the photo-electric converter 24F is as illustrated by the long dashed and short dashed line graph SF1 in FIG. 2B. Comparing between both of them, the graph SF1 has a more dulled waveform than the graph SB1. This is because the speed of response of the light output from the phosphor 908 is lower as described above.

Accordingly, equalization is performed by the equalizers 28B and 28F in this embodiment. The equalizers 28B and 28F adjust frequency characteristics against the response characteristic of blue light and the response characteristic of phosphor light and emphasize the harmonic components. This changes the states in the graphs SB1 and SF1 in FIG. 2B to the states in graphs SB2 and SF2 in FIG. 2C and can reduce the degree of dullness of the waveforms. The equalized signals are added by the adder 30, and the result is input to the discriminator 34 in the demodulator 32 for binarization. Since the dullness of the waveform has been improved, the binarization processing can be performed well. Therefore, high speed data transmission is allowed.

In a case of the method that does not split blue light and phosphor light as in the related art, the equalization processing is performed on the added state of the light with different time response characteristics. For that reason, the circuit structure of the equalizer is complicated for performing optimum equalization for high speed data transmission, and it is difficult to tune it, disadvantageously. According to this embodiment on the other hand, an equalizer is provided to each of blue light and phosphor light, which may improve the simplicity and practicality.

Second Embodiment

Next, a second embodiment of the invention will be described. The same reference numerals are given to the same or corresponding components as those in the first embodiment (which is also true in the descriptions on third and subsequent embodiments). This embodiment is an example that adaptive equalizers that equalize amplified signals adaptively are used as the equalizers 28B and 28F in the first embodiment. The equalizers in the first embodiment have a fixed coefficient (that is, a fixed characteristic) while the adaptive equalizers of this embodiment have a variable coefficient, that is, the characteristic varies according to the input waveform. By using the adaptive equalizer, good data transmission quality can always be maintained against the change in output light characteristics due to dispersion and/or secular deterioration (refer to "Shiroiro LED No Kido Rekka No Kousatsu (Review on Brightness Deterioration of White LED)", 2006, The Institute of Electronics, Information, Communication Engineers (IEICE), Engineering Sciences Society Conference) of the emission characteristic of the blue light-excited white LED 14. In particular, the adaptive equalizer is preferable since a phosphor is easier to deteriorate than an LED. Furthermore, it is said that the blue light-excited white LED 14 has uneven color in the emission direction (refer to "Shiroiro LED Shomei Shisutemu Gijutsu no Ouyou to Shorai tenbou (Applications and Future Prospects of White LED Illumination System Technology), CMC Publishing). More specifically, in the spatial distribution of light, blue is stronger as it goes to the center while yellow is stronger as it goes to the outside. Even in this case, this embodiment can always maintain good data transmission quality independent of the position relationship between the blue light-excited white LED 14 and the receiver 20 (more specifically, the incident angle of light).

Third Embodiment

Next, with reference to FIG. 1B, a third embodiment of the invention will be described. According to this embodiment, an ultraviolet light-excited white LED 44, which is white light emitting means, is provided in a transmitter 40, as shown in FIG. 1B, and the output light is quickly modulated by the modulator 12. On the receiver 50 side on the other hand, a blue fluorescence transmission color filter 52B, a red fluorescence transmission color filter 52R and a green fluorescence transmission color filter 52G, which are filter means, are provided. Among them, the blue fluorescence transmission color filter 52B is a filter that selectively allows the light emitted by a blue emitting phosphor to pass through in the white light output from the ultraviolet light-excited white LED 44. Also, the red fluorescence transmission color filter 52R is a filter that selectively allows the light emitted by a red emitting phosphor to pass through in the white light output from the ultraviolet light-excited white LED 44. The green fluorescence transmission color filter 52G is a filter that selectively allows the light emitted by a green emitting phosphor to pass through in the white light output from the ultraviolet light-excited white LED 44.

Photo-electric converters 54B, 54R and 54G, which are photo-electric converting means, are provided on the light output sides of the filters 52B, 52R and 52G, respectively. The electric signals converted by them are amplified by amplifiers 56B, 56R and 56G and are supplied to equalizers (or adaptive equalizers) 58B, 58R and 58G, which are equalizing means, respectively. The outputs by the equalizers 58B, 58R and 58G are added by an adder 60, which is adding means, and the result is discriminated by a discriminator 64, which is discriminating means, in a demodulator 62.

According to this embodiment, the blue, red and green rays in the white light are all phosphor light beams since the ultraviolet light-excited white LED 44 is used. Then, the phosphor rays are extracted by the color filters 52B, 52R and 52G, and the processing of photo-electric conversion, amplification and equalization is performed thereon like the embodiments above. Also in this embodiment, the equalizers 58B, 58R and 58G adjust the frequency characteristics against the response characteristics of blue, red and green phosphor rays and emphasize the harmonic components, which can improve the dullness of waveforms. Therefore, binarization processing can be performed thereon well, and high speed data transmission is allowed, like the embodiments above.

The ultraviolet light-excited white LED 44, which is light emitting means, is excited by a light source of a light emitting diode with the peak wavelength in a range of about 380 to 410 nm to emit light in longer wavelengths than the peak wavelength of the light emitting diode. They are rays in the primary three colors of blue, red and green emitted from multiple types of phosphor, and white light is emitted by the additive color mixing of them.

Fourth Embodiment

Next, with reference to FIG. 3A, a fourth embodiment of the invention will be described. The object of this embodiment is to enlarge the dynamic range. The output side of the amplifier 26B in the circuit on the blue LED light side of a receiver 100 connects to one input side of an adder 30, which is an adding means, and the input side of a signal level detector 102. On the other hand, the output side of the amplifier 26F in the circuit on the phosphor side connects to the input side of an analog switch 104, which is switch means, and the output side of the analog switch 104 connects to the other input side of the adder 30. The detection output side of the signal level detector 102 connects to a control terminal for the analog switch 104 to perform the ON/OFF operation by the analog switch 104 based on the detection result by the signal level detector 102. The signal level detector and the analog switch are included in signal control means. The output side of the adder 30 is the same as that of the first embodiment.

Among the components above, the signal level detector 102 detects the height of the amplitude level of an input signal and outputs the result and is applicable to an RSSI (Received Signal Strength Indicator) or a peak bottom detector using a log amplifier, for example. A predetermined threshold value is preset in the signal level detector 102. If the input signal level is not higher than the threshold value, the analog switch 104 is controlled to "ON" based on the control signal. If the input signal level is higher than the threshold value, the analog switch 104 is controlled to "OFF".

Operations of this embodiment in the configuration above will be described next. The operations by the transmitter 10 side are the same as those of the first embodiment, and blue LED light and phosphor light modulated based on a data signal enter to the receiver 100. The operations up to the output of amplified signals by the amplifiers 26B and 26F among the operations by the receiver 100 side are also the same as those of the first embodiment.

A signal relating to the blue LED light output from the amplifier 26B is input to the signal level detector 102. Here, if the signal level detector 102 determines that the signal level of the blue LED light is higher than a predetermined threshold value, the analog switch 104 is controlled to "OFF". Thus, a signal relating to blue LED light from the amplifier 26B is only supplied to the adder 30, the result of which is then supplied to the demodulator 32. On the other hand, if the signal level detector 102 determines that the signal level of the blue LED light is not higher than the predetermined threshold value, the analog switch 104 is controlled to "ON". Thus, a signal relating to blue LED light from the amplifier 26B and a signal relating to phosphor light from the amplifier 26F are supplied to and added in the adder 30, the result of which is then supplied to the demodulator 32.

For example, if the distance between the transmitter 10 and the receiver 100 is short and if the quantity of blue LED light to enter to the receiver 100 is large, the signal of the blue LED light is only input to the demodulator 32. In this case, information can be sufficiently transmitted only with blue LED light. Since phosphor light is not used, the dullness of waveforms due to phosphor light and/or the effect due to the space-charge effect can be reduced. Conversely, if the distance between the transmitter 10 and the receiver 100 is long and if the quantity of the blue LED light to enter to the receiver 100 is small, the signals of the blue LED light and phosphor light are added, the result of which is then input to the demodulator 32. Therefore, demodulation can be performed thereon by using not only blue LED light but also phosphor light effectively.

According to this embodiment in this way, by selecting the light to be used for transmission according to the quantity of incident light of blue LED light, the dynamic range of the receiver can be enlarged, that is, the range of data transmission length can be enlarged.

Fifth Embodiment

Next, with reference to FIG. 3B, a fifth embodiment of the invention comprising a second signal control means will be described. According to this embodiment as shown in FIG. 3B, a PGA (Programmable Gain Amplifier) 112, which is switch means, is connected instead of the amplifier 26F and analog switch 104 on the phosphor light side of the receiver 110, compared with the fourth embodiment. A control signal of the signal level detector 102 is input to the control input side of the PGA 112. The PGA 112 has a function that can perform gain control over signal amplification according to the detection result by the signal level detector 102. In other words, if the signal level detector 102 determines that the input signal level is not higher than the threshold value, the gain by the PGA 112 is controlled to a predetermined value based on the control signal. If the input signal level is higher than the threshold value on the other hand, the gain by the PGA 112 is controlled to "0". According to this embodiment, the operations by the amplifier 26F and analog switch 104 in the fourth embodiment are performed by the PGA 112.

Sixth Embodiment

Next, with reference to FIG. 4A, a sixth embodiment of the invention will be described. This embodiment is a combination of the first embodiment in FIG. 1A and the fourth embodiment in FIG. 3A. In other words, the output side of the amplifier 26B, which is a circuit of the blue LED light side of the receiver 120, connects to the input side of the equalizer 28B and the input side of the signal level detector 102. On the other hand, the output side of the amplifier 26F, which is a circuit of the phosphor light side, connects to the input side of the analog switch 104, and the output side of the analog switch 104 connects to the input side of the equalizer 28F. The output sides of the equalizers 28B and 28F connect to the input side of the adder 30. The output side of the adder 30 is the same as that of the first embodiment.

The operations of this embodiment are a combination of those of the first and fourth embodiments. That is, if the signal level detector 102 determines that the signal level of blue LED light is higher than a predetermined threshold value, the analog switch 104 is controlled to "OFF". Therefore, equalization processing by the equalizer 28B is only performed on the signal output from the amplifier 26B, and the result is added to the adder 30. On the other hand, if the signal level detector 102 determines that the signal level of blue LED light is not higher than the predestined threshold value, the analog switch 104 is controlled to "ON". Therefore, equalization processing by the equalizers 28B and 28F is performed on the signals output from the amplifiers 26B and 28B, and the results are added in the adder 30.

This embodiment can provide the effect by the equalization processing of the first embodiment and the effect by the signal selection of the fourth embodiment. In other words, not only the improvement of transmission quality of high speed transmission but also the enlargement of the dynamic range can be attempted. A combination of the second and fourth embodiments can be implemented by using adaptive equalizers as the equalizers 28B and 28F in this embodiment.

Seventh Embodiment

Next, with reference to FIG. 4B, a seventh embodiment of the invention will be described. According to this embodiment as shown in FIG. 4B, a PGA 112 is connected instead of the amplifier 26F and analog switch 104 on the phosphor light side of a receiver 130, and a control signal by the signal level detector 102 is input to the control input side of the PGA 112, compared with the sixth embodiment. The seventh embodiment may be considered as a combination of the first embodiment in FIG. 1A and the fifth embodiment in FIG. 3B, and the operations by the amplifier 26F and analog switch 104 in the sixth embodiment are performed by the PGA 112. Also in this embodiment, adaptive equalizers may be used as the equalizers 28B and 28F.

Eighth Embodiment

Next, with reference to FIG. 5A, an eighth embodiment of the invention will be described. As shown in FIG. 5A, the output side of the amplifier 26F on the phosphor light side connects to a signal level detector 142 of a receiver 140. In other words, the signal level of phosphor light in the amplifier 26F is detected to control the analog switch 104 according to this embodiment while the signal level of blue LED light in the amplifier 26B is detected according to the fourth embodiment in FIG. 3A as described above. According to this embodiment, if the signal level detector 142 determines that the signal level of phosphor light is higher than a predetermined threshold value, the analog switch 104 is controlled to "OFF". Thus, a signal relating to the blue LED light from the amplifier 26B is only supplied to the adder 30, the result of which is then supplied to the demodulator 32. On the other hand, if the signal level detector 142 determines that the signal level of phosphor light is not higher than the predetermined threshold value, the analog switch 104 is controlled to "ON". Therefore, a signal relating to the blue LED light from the amplifier 26B and a signal relating to the phosphor light from the amplifier 26F are supplied and added, the result of which is then supplied to the demodulator 32.

Ninth Embodiment

Next, with reference to FIG. 5B, a ninth embodiment of the invention will be described. This embodiment is a combination of the first embodiment in FIG. 1A and the eighth embodiment in FIG. 5A. That is, the output side of the amplifier 26B on the blue LED light side of a receiver 150 connects to the input side of the equalizer 28B. On the other hand, the output side of the amplifier 26F on the phosphor side connects to the input sides of the analog switch 104 and signal level detector 142, and the output side of the analog switch 104 connects to the input side of the equalizer 28F. Then, the output sides of the equalizers 28B and 28F connect to the input side of the adder 30. The output side of the adder 30 is the same as that of the first embodiment.

The operations of this embodiment are a combination of those of the first embodiment and eighth embodiment. That is, if the signal level detector 142 determines that the signal level of phosphor light is higher than a predetermined threshold value, the analog switch 104 is controlled to "OFF". Therefore, a signal relating to the blue LED light from the amplifier 26B only undergoes the equalization processing in the equalizer 28B and is supplied to the adder 30 and then to the demodulator 32. On the other hand, if the signal level detector 142 determines that the signal level of phosphor light is not higher than the predetermined threshold value, the analog switch 104 is controlled to "ON". Thus, the output signals by the amplifiers 26B and 26F undergo the equalization processing in the equalizers 28B and 28F and are supplied to the adder 30. Then, the added signal is supplied to the demodulator 32. Also according to this embodiment, adaptive equalizers may be used as the equalizers 28B and 28F.

Various changes and alteration can be made to the embodiments described above without departing from the scope and spirit of the invention as follows, for example:

(1) The "blue light-excited white LED" may include an LED containing a red component in the phosphor luminescence component, which has been developed recently, though the phosphor 908 excited by the light of the blue LED 900 of the blue light-excited white LED emits yellow light in the complementary color relation.
(2) Analog or digital equalizers or adaptive equalizers may be used herein.
(3) The color filter and the photo-electric converter may be integrated as a color sensor or a photo detector. Since a photo detector has a wavelength range of light to be photo-electrically converted, the photo detector may have characteristics as a color filter by setting the wavelength range to a desired value.

Certain embodiments allow high speed data transmission since light in multiple wavelength ranges is extracted from modulated light containing phosphor light to perform signal processing. Therefore, these embodiments are suitable for visible light communication using a white LED, particularly, a blue light-excited white LED.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical receiver that receives light beams in multiple wavelength ranges from a light transmitter, the light beams being emitted in different speeds of response by a light emitting diode and a phosphor that is excited by the light emitting diode to emit light and being modulated for data transmission, the optical receiver comprising:
    multiple filters configured to selectively allow the light beams in the multiple wavelength ranges to pass through;
    multiple photo-electric converters configured to convert light beams that pass through the respective multiple filters to electric signals;
    multiple equalizers configured to equalize the respective electric signals after the conversion by the respective multiple photo-electric converters, by emphasizing harmonic components of the respective electric signals according to the speed of response of the respective light beams in wavelength ranges;
    an adder configured to add the outputs of the multiple equalizers to one added output; and
    a discriminator configured to perform discrimination processing on the added output by the adder.

2. The optical receiver according to claim 1, wherein the light transmitter is a blue light-excited white light emitter configured to emit white light by mixing the light of a light emitting diode with the peak wavelength in a range of about 440 to 470 nm and the light emitted from a phosphor that is excited by a light source of the light emitting diode to emit light in a longer wavelength than the peak wavelength of the light emitting diode.

3. The optical receiver according to claim 1, wherein the light emitter is an ultraviolet light-excited white light emitter configured to emit white light from multiple types of phosphor that are excited by a light source of a light emitting diode with the peak wavelength in a range of about 380 to 410 nm to emit light in a longer wavelength than the peak wavelength of the light emitting diode.

4. The optical receiver according to claim 1, wherein the equalizers are adaptive equalizers that adaptively equalize waveforms.

5. The optical receiver according to claim 1, wherein each of the multiple wavelengths is preferentially passed through one of the filters.

6. The optical receiver according to claim 1, wherein each filter is configured to preferentially pass one of the multiple wavelengths.

7. The optical receiver according to claim 1, wherein the multiple filters comprise:
    a first filter configured to preferentially pass light beams emitted by the light emitting diode through; and
    a second filter configured to preferentially pass light beams emitted by the phosphor through.

8. A visible light communication device that uses at least one white light emitter comprising a phosphor functioning as a light source on the transmitter side and receives the light using the optical receiver according to claim 1.

9. An optical receiver that receives light beams in multiple wavelength ranges from a light transmitter, the light beams being emitted in different speeds of response by a light emitting diode and a phosphor that is excited by the light emitting diode to emit light and being modulated for data transmission, the optical receiver comprising:
    multiple filters configured to selectively allow the respective modulated light beams in the multiple wavelength ranges to pass through;
    multiple photo-electric converters configured to convert respective light beams passing through the multiple filters to electric signals;
    an adder configured to add the outputs of the multiple photo-electric converters to one added output;
    a discriminator configured to perform discrimination processing on the added output by the adder; and
    a signal control module configured to (i) continuously input to the adder the output of the photo-electric converter converting the light beam emitted by the light emitting diode, (ii) detect the signal level of the output of the photo-electric converter in (i), and (iii) prevent the output of the other photo-electric converter converting the light beam emitted by the phosphor from inputting to the adder if the detected signal level is equal to or higher than a predetermined threshold value.

10. The optical receiver according to claim 9, further comprising multiple equalizers configured to equalize the outputs of the multiple photo-electric converters according to the speed of response upon light output by the light emitters, which multiple equalizers are provided after the multiple photo-electric converters respectively.

11. The optical receiver according to claim 10, wherein the equalizers are adaptive equalizers that adaptively equalize waveforms.

12. The optical receiver according to claim 9, wherein the signal control module comprises:
    a signal level detector configured to detect the signal level of the output of one of the photo-electric converters; and
    a switch configured to control the output of another photo-electric converter according to the detection result by the signal level detector.

13. The optical receiver according to claim 12, further comprising multiple equalizers configured to equalize the outputs of the multiple photo-electric converters according to the speed of response upon light output by the light emitters, which multiple equalizers are provided after the multiple photoelectric converters respectively.

14. The optical receiver according to claim 13, wherein the equalizers are adaptive equalizers that adaptively equalize waveforms.

15. An optical receiver that receives light beams in multiple wavelength ranges from a light transmitter, the light beams being emitted in different speeds of response by a light emitting diode and a phosphor that is excited by the light emitting diode to emit light and being modulated for data transmission, the optical receiver comprising:
- multiple filters configured to selectively allow the respective modulated light beams in the multiple wavelength ranges to pass through;
- multiple photo-electric converters configured to convert respective light beams passing through the multiple filters to electric signals;
- an adder configured to add the outputs of the multiple photo-electric converters to one added output;
- a discriminator configured to perform discrimination processing on the added output by the adder; and
- a signal control module configured to (i) continuously input to the adder the output of the photo-electric converter converting the light beam emitted by the light emitting diode, (ii) detect the signal level of the output of the other photo-electric converter converting the light beam emitted by the phosphor, and (iii) prevent the output of the other photo-electric converter from inputting to the adder if the detected signal level is equal to or higher than a predetermined threshold value.

16. The optical receiver according to claim 15, further comprising multiple equalizers configured to equalize the outputs of the multiple photo-electric converters according to the speed of response upon light output by the light emitters, which multiple equalizers are provided after the multiple photo-electric converters respectively.

17. The optical receiver according to claim 16, wherein the equalizers are adaptive equalizers that adaptively equalize waveforms.

18. The optical receiver according to claim 15, wherein the signal control module comprises:
- a signal level detector configured to detect the signal level of the output of one of the photo-electric converters; and
- a switch configured to control the output of another photo-electric converter according to the detection result by the signal level detector.

19. The optical receiver according to claim 18, further comprising multiple equalizers configured to equalize the outputs of the multiple photo-electric converters according to the speed of response upon light output by the light emitters, which multiple equalizers are provided after the multiple photoelectric converters respectively.

20. The optical receiver according to claim 19, wherein the equalizers are adaptive equalizers that adaptively equalize waveforms.

* * * * *